US008160267B2

(12) United States Patent
Sakamoto

(10) Patent No.: US 8,160,267 B2
(45) Date of Patent: Apr. 17, 2012

(54) CAR AUDIO EQUIPMENT

(75) Inventor: Akira Sakamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1287 days.

(21) Appl. No.: 10/995,109

(22) Filed: Nov. 24, 2004

(65) Prior Publication Data

US 2005/0190935 A1 Sep. 1, 2005

(30) Foreign Application Priority Data

Nov. 27, 2003 (JP) ................................ P2003-398101

(51) Int. Cl.

*H04B 1/00* (2006.01)
*H04B 1/06* (2006.01)
*H04B 1/16* (2006.01)
*H04R 5/02* (2006.01)
*H04R 1/02* (2006.01)
*A47C 31/00* (2006.01)

(52) U.S. Cl. .......... 381/86; 381/301; 381/302; 381/309; 381/389; 381/123; 297/217.3; 297/217.4; 455/345; 455/200.1

(58) Field of Classification Search .................... 381/86, 381/301, 302, 309, 389; 297/217.3, 217.4; 455/345

See application file for complete search history.

(56) References Cited

U.S. PATENT DOCUMENTS

| | | | | |
|---|---|---|---|---|
| 5,073,944 | A * | 12/1991 | Hirasa | 381/86 |
| 5,617,477 | A | 4/1997 | Boyden | |
| 5,661,811 | A * | 8/1997 | Huemann et al. | 381/309 |
| 5,721,541 | A * | 2/1998 | Repp et al. | 341/20 |
| 6,373,472 | B1 * | 4/2002 | Palalau et al. | 345/173 |
| 2003/0103636 | A1 * | 6/2003 | Arai et al. | 381/302 |

FOREIGN PATENT DOCUMENTS

| | | |
|---|---|---|
| CA | 2225224 | 6/1999 |
| EP | 1 137 319 | 9/2001 |
| EP | 1 238 859 A1 | 9/2002 |
| JP | 02-305157 | 12/1990 |
| JP | 02305157 A * | 12/1990 |
| JP | 05-293172 | 11/1993 |
| JP | 2554224 | 8/1996 |
| JP | 11-501479 | 2/1999 |
| JP | 2000-5385 | 1/2000 |
| JP | 2000-065592 | 3/2000 |
| JP | 2003-224653 | 8/2003 |

OTHER PUBLICATIONS

European Search Report; Application No. 04292788.9-2202; dated Dec. 7, 2006.
European Communication pursuant to Article 94(3) EPC issued Jan. 22, 2010 for Corresponding European Application No. 4 292 788.9.

* cited by examiner

*Primary Examiner* — Devona Faulk
(74) *Attorney, Agent, or Firm* — Rader, Fishman & Grauer PLLC

(57) ABSTRACT

In order to enable a driver to obtain traffic jam information or to listen to a navigation guidance voice from a car navigation system without interrupting the reproduction of music when a passenger enjoys music reproduced by a CD player and the like through cabin loudspeakers, the present invention provides car audio equipment in which a pair of loudspeakers is disposed on both sides of a headrest of a driver's seat. The equipment processes at a decoder thereof a sound signal from a radio tuner, a car navigation device, a mobile phone and the like selected by a selector using a changeover switch, and the sound signal is reproduced through the loudspeakers.

8 Claims, 4 Drawing Sheets

CAR AUDIO EQUIPMENT

CROSS REFERENCES TO RELATED APPLICATIONS

The present document is based on Japanese Priority Document JP 2003-398101, filed in the Japanese Patent Office on Nov. 27, 2003, the entire contents of which are incorporated herein by reference.

BACKGROUND OF THE INVENTION

1. Field of the Invention

The present invention relates to car audio equipment and, in particular, to car audio equipment having cabin loudspeakers attached to predetermined positions in a vehicle cabin, so as to enable sound output of the audio equipment through the cabin loudspeakers.

2. Description of Related Art

Automobiles are equipped with audio equipment so that a driver and one or more passengers can enjoy music and so forth during driving. The audio equipment comprises a radio tuner, a tape player, a CD player and so forth, obtains therefrom sound signals as sources (sound sources), and processes the sound signals to be output from loudspeakers. The loudspeakers are typically embedded in car doors, so as to allow the loudspeakers to reproduce sound.

A car navigation device equipped in the car is designed to use ATT signals so as to output a voice of navigation guidance. A voice output unit of the navigation device is provided in common with a sound output unit of the car audio equipment, so that the voice of the navigation guidance of the car navigation device is output by attenuating or muting audio outputs of the car audio equipment, which are signals of music and so forth, and by overlaying or inserting thereto the navigation guidance voice.

The navigation guidance voice is useful for the driver, but maybe substantially useless for a passenger, and may make them feel unpleasant because the music output reproduced by the CD player and so forth is interrupted. Also, an output unit of the radiotuner is provided in common with the loudspeakers of the audio equipment, so that the driver who wants to listen to traffic information, such as traffic jam information on the radio receiver, has to interrupt music that the passenger is enjoying and to exchange the audio source from the CD player to the radio tuner. Also, this situation makes the passenger feel unpleasant not only because the music he/she is listening is interrupted, but also because he/she is forced to listen to the unnecessary traffic jam information.

During midnight driving or the like, the driver who wants to enjoy music cannot enjoy it with an appropriate volume if the passenger falls a sleep. In a configuration having the car audio equipment linked with a mobile phone or a car telephone set, the loudspeakers of the audio equipment reproduce the voice of the opposite party when a phone call is received. This situation also raises nonconformities not only in that the music under reproduction is interrupted, but also in that the passenger may possibly hear the conversation. For the case where the mobile phone or the car telephone set is linked with the audio equipment, reproduction of the received voice through the audio loudspeakers is allowed only when the driver can drive alone while reproducing it.

Japanese Patent Application Publication (KOKAI) No. Hei 2-305157 discloses a car telephone control device comprising a handset holder having handset detection means detecting the presence or absence of a handset of a car telephone set, and also having a transmission loudspeaker and a transmission microphone respectively in correspondence with a mouthpiece and an earpiece of the handset; seating detection means detecting the presence or absence of a seated person; a pair of side-headrests disposed on the left and right sides of a headrest on a top end of a seat back so as to be freely slidable forward and backward, and so as to be swung respectively to a setback position, a riding position and a speaking position corresponding to the presence or absence of the seated person, and also to the presence or absence of the handset on the handset holder; pillow loudspeakers built in the side-headrest so as to output selectively sound from car components and voice from a transmission microphone; a speaking microphone disposed in a swingable manner on the side of one side-headrest and being communicated with the transmission loudspeaker of the handset holder, and it is swung from a housing position not interfering with the driving operation or getting on and off of the seated person to a speaking position where the seated person can speak, based on the detection of the handset by a handset detection unit; a headrest motor which swings the side-headrest; a speaking microphone motor which swings the speaking microphone; and a central processing unit which processes input information according to a predetermined program, and controls operations of the headrest motor and the speaking microphone motor and switching of output sound from the pillow loudspeakers; wherein the output sound from the pillow loudspeakers is switched to voice from the car telephone upon placement of the handset on the handset holder, and at the same time the side-headrest and speaking microphone are swung to the speaking position, so as to set up a speaking environment.

The above-described configuration, however, inevitably interrupts the reproduction of sound of the car audio equipment during use of the car telephone and, therefore, cannot solve the problem that the passenger cannot enjoy music. The equipment is also disadvantageous in that it provides no solving means at all for harmonization of the voice output of navigation guidance by the car navigation device and the sound output from the audio equipment, because the equipment is not communicated with the car navigation device.

[Patent Document 1] Japanese Patent Application Publication (KOKAI) No. Hei 2-305157

[Patent Document 2] Japanese Patent Application Publication (KOKAI) No. 2000-5385

[Patent Document 3] Published Japanese Translation of PCT International Publication for Patent Application (KOHYO) No. 11-501479; and

[Patent Document 4] Japanese Patent Publication No. 2554224.

SUMMARY OF THE INVENTION

Therefore, the present invention is to provide car audio equipment designed to allow a driver and/or a passenger on a navigator seat to obtain other voice information, while keeping the car audio equipment operating.

The present invention also is to provide car audio equipment designed to allow a driver to receive traffic information, such as traffic jam information, through a radio receiver without interrupting the reproduction of music by the car audio equipment.

Further, the present invention also is to provide car audio equipment designed to allow a driver to listen to the voice of navigation guidance of a car navigation device while a passenger is listening to the car audio equipment.

The present invention also is to provide car audio equipment designed to allow a driver to receive the voice of a mobile phone without interrupting the reproduction of music by the car audio equipment.

Still further, the present invention is also to provide car audio equipment designed to allow a driver to listen to music without interrupting a sleeping passenger.

The present invention will be apparent from the abstract and embodiments of the present invention described below.

A major aspect of the present invention relates to car audio equipment comprising cabin loud speakers that are attached to predetermined positions of a vehicle cabin and compose an output section of the car audio equipment, personal-use loudspeakers attached to a headrest or to a seat back of a driver seat and/or a navigator seat, and a switching unit which switches sources of sound signals supplied to the cabin loudspeakers and to the personal-use loudspeakers, wherein the personal-use loudspeakers are designed to reproduce sound signals other than those reproduced by the cabin loudspeakers.

The cabin loudspeakers are preferably attached inside the doors. The personal-use loudspeakers are preferably used in a pair form and attached to both sides of the headrest of the driver seat and/or the navigator seat. The sound signal reproduced only by the personal-use loudspeakers is preferably any of a signal received by a radio tuner, a voice signal of guidance of a car navigation device and a voice signal received by a mobile phone. It is also preferable that the car audio equipment further comprises an operating unit, by the operation of which the personal-use loudspeakers reproduce a sound signal other than that reproduced by the cabin loudspeakers. It is still also preferable that the car audio equipment further comprises an automatic discrimination unit, and that the personal-use loudspeakers reproduce the sound signal other than that reproduced by the cabin loudspeakers upon discrimination by the automatic discrimination unit. It is still also preferable that the personal-use loudspeakers reproduce the voice signal received by a mobile phone, when the automatic discrimination unit detects a call on a mobile phone or a car telephone.

One preferable embodiment of the present invention is a system used in a vehicle, such as a car or the like, having loudspeakers (loudspeakers "A") dedicated for a driver, attached to a driver sheet so as to be integrated with a headrest or with a seat, capable of independently switching sources of sound signals, and wherein considering that the voice of navigation guidance is necessary only for a driver, the navigation voice is reproduced only from the loudspeakers "A", but not from door-mounted loudspeakers or the like (loudspeakers "B") attached to the doors of the vehicle. Similarly, the system is, also designed so that switching of the loudspeakers "A" can be effected absolutely independently of switching of the loudspeakers "B", typically for a case where traffic information necessary for the driver, voice from a mobile phone operated in a hands-free manner, or voice sources other than those listened by other passengers is heard. This successfully improves a situation in which all persons are forced to listen to the same music source, makes consistency between car safety and comfortability, and makes a large advancement in safety and comfortability.

According to the car audio equipment of the present invention, it is made possible to handle separately a sound signal reproduced by the cabin loudspeakers and a sound signal reproduced by the personal-use loudspeakers, by which a driver can reproduce a sound signal of necessary traffic information from a radio tuner, a sound signal of navigation guidance of a car navigation device, or a voice signal of a mobile phone, using the personal-use loudspeakers attached to the drivers seat and/or the passengers seat, while allowing a passenger to keep on listening to music reproduced by the cabin loudspeakers without interruption.

The present invention is widely applicable to car audio equipment.

DESCRIPTION OF PREFERRED EMBODIMENTS

Figure 1:
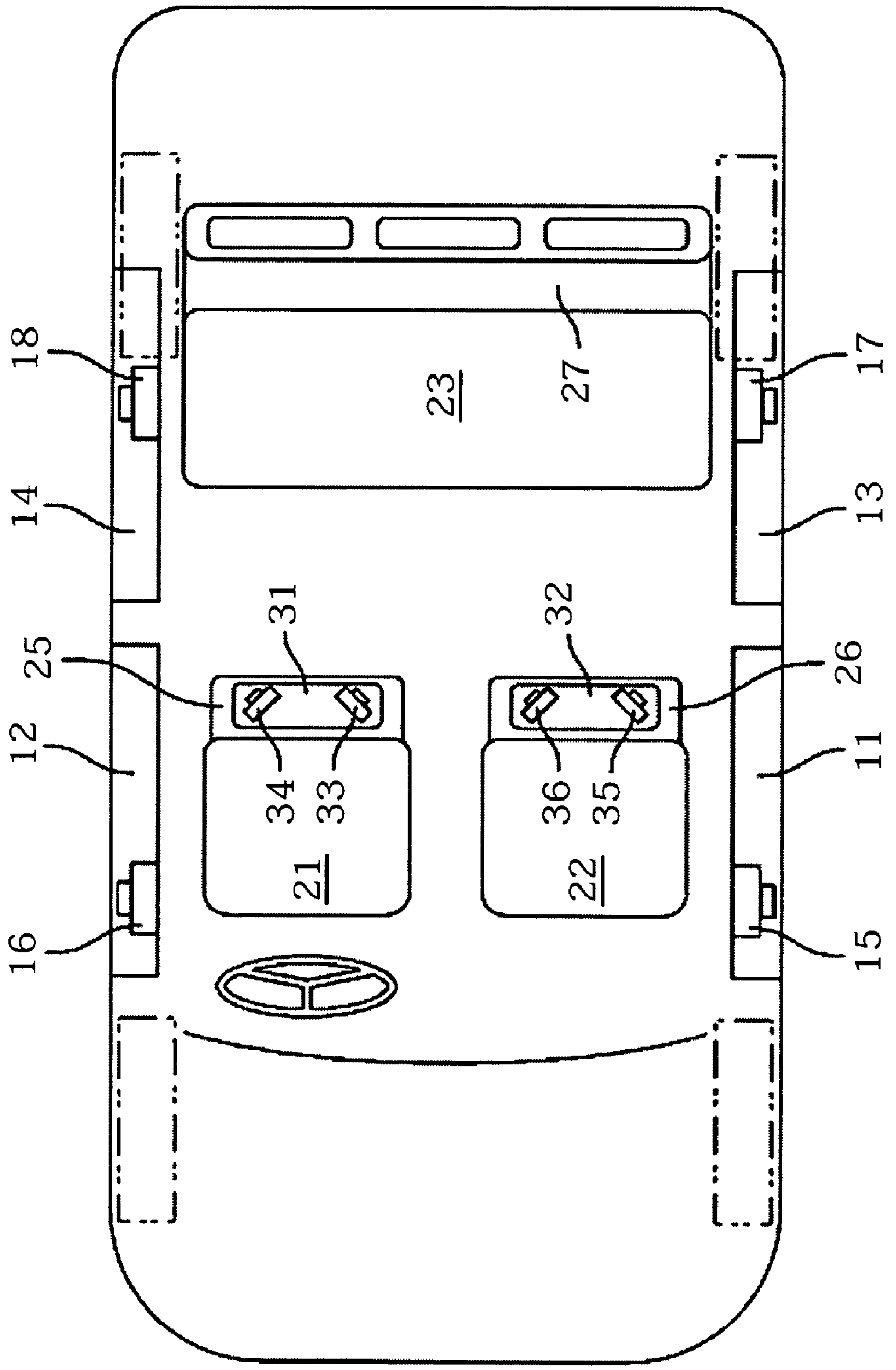
FIG. 1 is a plan view of a vehicle cabin of a car indicating an arrangement of loudspeakers.

FIG. 1 shows an arrangement of the loudspeakers in a vehicle cabin of a car equipped with the car audio equipment according to the present embodiment. The vehicle has front left and right doors 11, 12, rear left and right doors 13, 14, and loudspeakers 15 to 18 incorporated into the doors 11 to 14, respectively. The left front loudspeaker 15, the right front loudspeaker 16, the left rear loudspeaker 17, and the right rear loudspeaker 18 configure the cabin loudspeakers, and thereby audio equipment having these cabin loudspeakers 15 to 18 is equipped to the vehicle cabin of the car.

Inside the vehicle cabin of the car, there are arranged a seat 21 for a driver seat, a seat 22 for a navigator seat, and a seat 23 on the rear side. The seats 21 to 23 have seat backs 25, 26 and 27, respectively, which configure backrests.

The seat back 25 of the seat 21 for the driver seat has a headrest 31 attached on the top end thereof, and the seat back 26 of the seat 22 for the navigator seat has a headrest 32 attached thereto. The headrest 31 for the driver seat has a pair of loudspeakers 33, 34 incorporated therein on the right and left sides thereof, and the headrest 32 for the navigator seat has a pair of loudspeakers 35, 36 incorporated therein on the right and left sides thereof. These loudspeakers 33 to 36 configure the personal-use loudspeakers.

Figure 2:
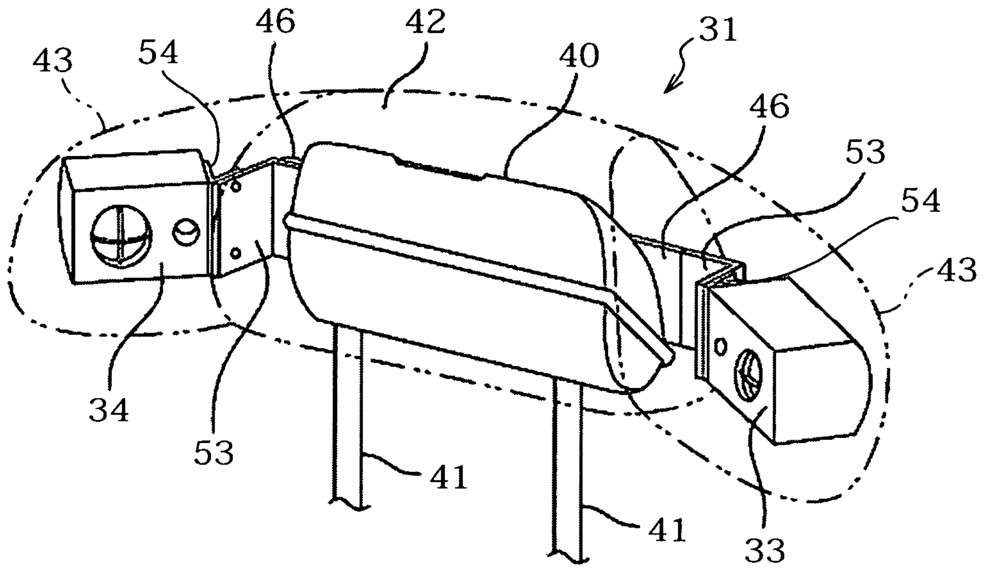
FIG. 2 is a perspective view showing an essential portion of a headrest incorporating the loudspeakers.
Figure 3:
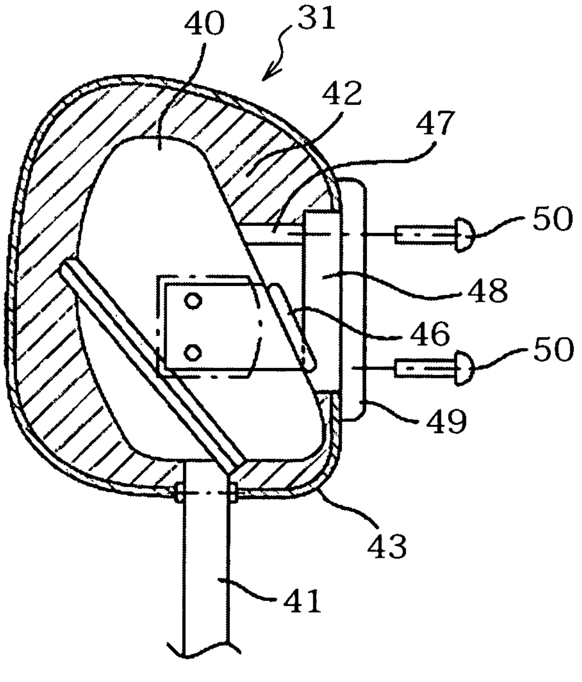
FIG. 3 is a vertical sectional view of an essential portion of the same headrest.

An explanation will be given of the attachment of the loudspeakers 33, 34, referring to an exemplary case of the headrest 31 for the driver seat. As shown in FIG. 2 and FIG. 3, the headrest 31 has a core 40 composed of a synthetic resin mold and a pair of support rods 41 fixed to the core 40. The support rods 41 are inserted into rod insertion holes disposed on the upper end of the seat back 25 so as to be opened upward, to thereby attach the headrest 31 to the upper end of the seat back 25. A cushion 42 composed of an elastic material is provided so as to enclose the core 40, and the cushion 42 is further wrapped by an outer skin 43 composed of leather or cloth.

On the back side of the core 40, there is attached an adapter plate 46, specifically as shown in FIG. 3, and also a back plate 48 while placing a rod 47 in between, wherein on the back side of the rear plate 48, a keep plate 49 is fixed using machine screws 50.

The adapter plate 46 is configured so as to thrust out leftward and rightward from the core 40, and it has brackets 53 fixed on the left and right ends thereof, wherein attachment portions 54 connected in a kinked form to the cabinets of the left and right loudspeakers 33, 34 are respectively fixed on the brackets 53.

Figure 4:
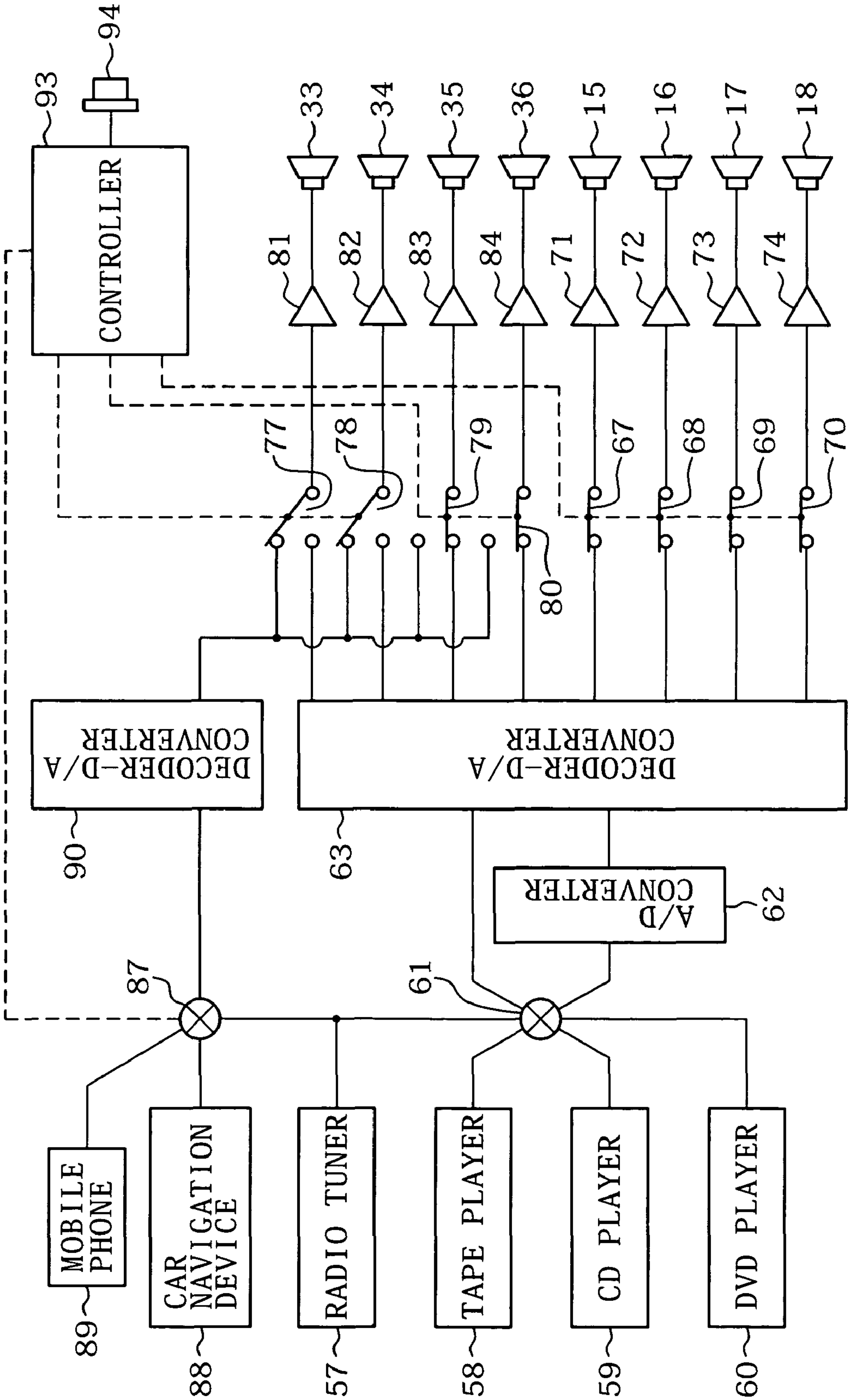
FIG. 4 is a block diagram showing a system configuration.

The next paragraphs will describe a system configuration of the above-described car audio equipment, referring to FIG. 4. The system comprises a radio tuner 57, a tape player 58, a CD player 59 and a DVD player 60 as audio sources of the car audio equipment. These audio sources 57 to 60 are connected, in a direct manner, to a selector 61, and the selector 61 is further connected via an A/D converter 62 to a decoder D/A converter (referred to as "decoder", hereinafter) 63.

Output ends of the decoder 63 are connected via open/close switches 67 to 70 to amplifiers 71 to 74, and the amplifiers 71 to 74 are further connected to the cabin loudspeakers 15 to 18. Output ends of the decoder 63 are respectively connected via change-over switches 77 to 80 to amplifiers 81 to 84. Output ends of the amplifiers 81 to 84 are connected to the above-described personal-use loudspeakers 33 to 36.

The audio equipment still further comprises another selector 87. The selector 87 is connected to a car navigation device 88 a mobile phone 89, and the radio tuner 57, which supplies a sound signal to the personal loudspeakers 33 to 36. Connection between the selector 87 and the mobile phone 89 is established using an earphone jack of the mobile phone 89. A decoder D/A converter (referred to as "decoder", hereinafter) 90 is connected to a succeeding stage of the selector 87.

An output end of the decoder 90 is connected to other connection points of the four above-described switches 77 to 80. A controller 93 is provided so as to control the open/close of the open/close switches 67 to 70 and the change-over switches 77 to 80. The controller 93 is connected via a control line to the selector 87. The controller 93 further has an operation button 94 connected thereto.

For a case where the car is driven while enjoying music signals using the thus-configured car audio equipment, the operating button 94 is operated to close all of the open/close switches 67 to 70 through the controller 93. All of the four change-over switches 77 to 80 are switched to the output end sides of the decoder 63 again through the controller 93. This allows any one of the audio sources selected by the selector 61, which is any one of the tape player 58, the CD player 59, or the DVD player 60, to be transmitted to the decoder 63 in a direct manner or as being mediated by the A/D converter 62. The decoder 63 processes the digital signal and makes an analog output. The analog output is supplied through the amplifiers 71 to 74 to the loudspeakers 15 to 18 and also output through the amplifiers 81 to 84 to the loudspeakers 33 to 35.

Therefore, the sound signal from the selected audio source in this case is output from four loudspeakers disposed to the four doors 11 to 14 and also output from the loudspeaker 33, 34 and 35, 36 disposed to the headrests 31, 32 of the driver seat 21 and the navigator seat 22, respectively.

Figure 6:
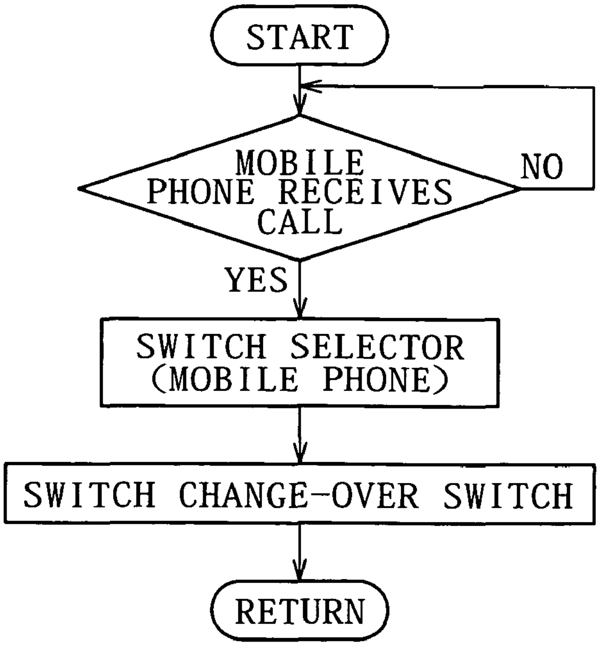
FIG. 6 is a flow chart showing an automatic switching operation in response to a call on a mobile phone.

On the other hand, for a case where only the driver wants to obtain road information, such as traffic jam information, through radio broadcasting, the operating button 94 is operated so as to make the controller 93 switch the change-over switches 77, 78 to the decoder 90 side as shown in FIG. 4, and a signal from the radio tuner 57 is input through the selector 87 to the decoder 90. This makes it possible to reproduce the radio broadcasting received by the radio tuner 57 by the loudspeakers 33, 34, while being mediated by the change-over switches 77, 78 and the amplifiers 81, 82. As a consequence, the driver can obtain the traffic jam information while listening to the radio broadcasting through the left and right loudspeakers 33, 34 disposed to the headrest 31. The control operation by a CPU of the controller 93 is shown in FIG. 6.

All of the cabin loudspeakers 15 to 18 and the loudspeakers 35, 36 of the navigator seat, which are in connection with the output ends of the decoder 63 herein, reproduce output from the audio source selected by the selector 61. The passengers seated on the navigator seat and/or the rear seat can enjoy music without interruption.

Also for a case where the driver wants to listen to voice output of the car navigation device 88, or navigation guidance, only the driver can listen to the voice of navigation guidance through the loudspeakers 33, 34 provided to the headrest 31, by operating the operation button 94, and switching the change-over switches 77, 78 using the controller 93 as shown in FIG. 4. Alteration of the operation of the controller 93 herein also makes it possible to listen to the voice of the navigation guidance through the loudspeakers 35, 36 disposed to the headrest 32 of the navigator seat. As a consequence, the driver and the passenger on the navigator seat can listen to the voice of navigation guidance in response to switching of the controller 93, and the passengers on the rear seat can keep on enjoying music without interruption.

Upon detection of a call by the mobile phone 89 connected to the selector 87, the controller 93 also detects it through the selector 87. In response to the detection of the call by the mobile phone, the controller 93 then, as shown in FIG. 6, switches the selector 87 to thereby transmit the voice signal of the mobile phone 89 to the decoder 90. At the same time, the changeover switches 77, 78 are switched by the controller 93, as shown in FIG. 4. This makes it possible to listen to the voice signal received by the mobile phone 89 through the loudspeakers 33, 34, and this enables hands-free speaking.

For a next case where the driver wants to drive at night listening to music while the passenger falls a sleep, the driver can drive while listening to the music only through the loudspeakers 33, 34 of the driver seat without interrupting the sleeping passenger by operating the operation button 94 to thereby make the controller 93 switch the changeover switches 77, 78 connected to the loudspeakers 33, 34 on the headrest 31 of the driver seat and, at the same time by turning the open/close switches 67 to 70 and changeover switches 79, 80 into the OFF state.

As described in the above, the car audio equipment of the present embodiment is configured so that the loudspeakers 33, 34 and/or 35, 36 dedicated for the driver seat and/or navigator seat, respectively, are provided is the driver seat and/or navigator seat in a vehicle's cabin, such as a car, and so that the circuit system is configured typically, as shown in FIG. 4, so as to enable the selection of music sources to be reproduced by the loudspeakers 33 to 36 independently of the selection of music sources to be reproduced for all passengers by the loudspeakers 15 to 18 attached to the doors 11 to 14 of the car, to thereby allow the user, through the controller 93, to arbitrarily set a situation where selection is made based on passengers' will and a situation where automatic switching takes place.

More specifically, the audio equipment is configured so as to allow reproduction by the loudspeakers 33, 34 independently of reproduction by the door-mounted cabin loudspeakers 15 to 18 for the case where the driver wants to listen to radio information, such as traffic information, at the driver's own will, when a compact disc is read by the CD player 59 and the signals therefrom is reproduced by the door-mounted loudspeakers 15 to 18. In addition, the audio equipment is also configured so that, in a case of receiving a call through the mobile phone 89, voice from the mobile phone 89 is automatically output from the loudspeakers 33, 34 for the driver.

Figure 5:
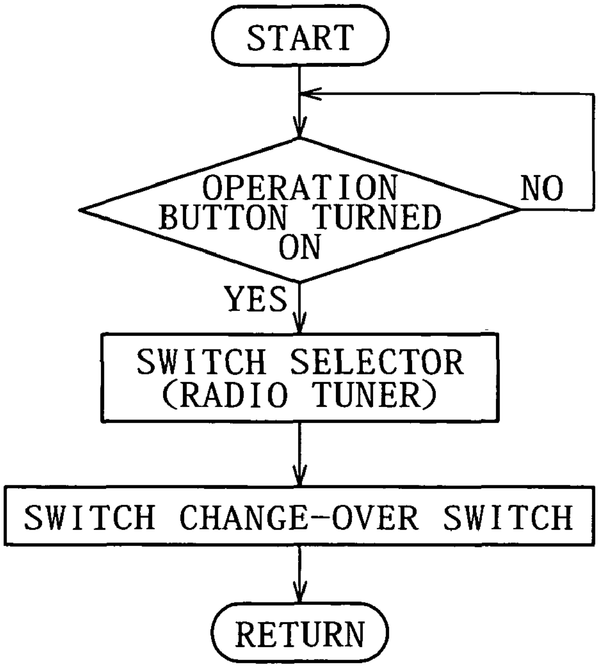
FIG. 5 is a flow chart showing a control operation in response to switching of operation buttons.

The hardware configuration is characterized by having the selectors 61, 87, wherein one selector 61 is designed to switch inputs to the door-mounted cabin loudspeakers 15 to 18 arranged for all passengers, whereas the other selector 87 is designed to switch inputs to the loudspeakers 33, 34 and/or the loud speakers 35, 36 for the driver and/or passenger on the navigator seat. The input source may be equivalent to both, or a driver-specific source may be added only to the driver side. The hardware is also designed so as to switch sources to be supplied to the loudspeakers 33, 34 for the driver through the controller 93 having the operation button 94, and so as to effect automatic switching control according to a preset program shown in FIG. 5 or FIG. 6, by the CPU incorporated in the controller 93.

Although the above example dealt only with a driver of a vehicle, such as a car, it is also allowable to incorporate the system for any other specific passenger or for all passengers.

While the present invention was described referring to the embodiment shown in the drawings, the present invention is by no means limited to the above-described embodiment, and it may be modified without departing from the technical spirit of the present invention. For example, the cabin loudspeakers 15 to 18 attached inside the doors 11 to 14 in the above-described embodiment may be disposed at different positions in the vehicle cabin. It is not always necessary for the loudspeakers 33, 34 and 35, 36 for the driver and the passenger on the navigator seat to be attached to the headrests 31, 32, and they may be attached to the upper end of the seat backs 25, 26 so as to oppose the shoulder portion or higher portion of the driver or the passenger on the navigator seat.

What is claimed is:

1. Car audio equipment comprising:

cabin loudspeakers which are attached to predetermined positions of a vehicle cabin and compose an output section of said car audio equipment;

personal-use loudspeakers attached to a headrest or to a seat back of a driver seat and/or a navigator seat;

a switching unit which switches sources of sound signals supplied to said cabin loudspeakers and to said personal-use loudspeakers, wherein said personal-use loudspeakers are designed to reproduce a first sound signal independent of a second sound signal reproduced by said cabin loudspeakers;

wherein a first sound signal is produced from one of a first plurality of sound sources;

wherein a second sound signal is produced from one of a second plurality of sound sources;

a first selector for transmitting said first sound signal to said personal-use loudspeakers via a first decoder;

a second selector for transmitting said second sound signal to said personal-use loudspeakers and cabin loudspeakers via second decoder and an A/D converter;

and an operation unit, wherein said operation unit is operated so that said personal-use loudspeakers independently reproduce said first sound signal in response to an input from the driver and/or navigator while said cabin loudspeakers continue to reproduce said second sound signal.

2. The car audio equipment according to claim 1, wherein said cabin loudspeakers are attached inside of doors of the vehicle.

3. The car audio equipment according to claim 1, wherein said personal-use loudspeakers are disposed at both sides of said headrest of the driver seat and/or the navigator seat in pairs.

4. The car audio equipment according to claim 1, wherein said first sound signal reproduced by said personal-use loudspeakers is any one of a signal received by a radio tuner, a voice signal of guidance of a car navigation device and a voice signal received by a mobile phone.

5. Car audio equipment comprising:

cabin loudspeakers which are attached to predetermined positions of a vehicle cabin and compose an output section of said car audio equipment;

personal-use loudspeakers attached to a headrest or to a seat back of a driver seat and/or a navigator seat;

a switching unit which switches sources of sound signals supplied to said cabin loudspeakers and to said personal-use loudspeakers, wherein said personal-use loudspeakers are designed to reproduce a first sound signal independent of a second sound signal reproduced by said cabin loudspeakers;

wherein a first sound signal is produced from one of a first plurality of sound sources;

wherein a second sound signal is produced from one of a second plurality of sound sources;

a first selector for transmitting said first sound signal to said personal-use loudspeakers via a first decoder;

a second selector for transmitting said second sound signal to said personal-use loudspeakers and cabin loudspeakers via second decoder and an A/D converter;

and automatic discriminating unit, wherein said personal-use loudspeaker independently reproduces said first sound signal according to discrimination by said automatic discriminating unit and reproduces a voice signal received by a mobile phone or a car telephone upon detection of a call received at said mobile phone or said car telephone by said automatic discriminating unit.

6. The car audio equipment according to claim 5, wherein said cabin loudspeakers are attached inside of doors of the vehicle.

7. The car audio equipment according to claim 5, wherein said personal-use loudspeakers are disposed at both sides of said headrest of the driver seat and/or the navigator seat in pairs.

8. The car audio equipment according to claim 5, wherein said first sound signal reproduced by said personal-use loudspeakers is any one of a signal received by a radio tuner, a voice signal of guidance of a car navigation device and a voice signal received by a mobile phone.

* * * * *